United States Patent
Conley et al.

(10) Patent No.: US 9,010,863 B2
(45) Date of Patent: Apr. 21, 2015

(54) BUS SEATING SYSTEM

(75) Inventors: Chad M. Conley, Sugar Grove, IL (US); Brian J. Jacquay, Sugar Grove, IL (US); Erik C Wilson, West Lafayette, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 337 days.

(21) Appl. No.: 13/601,601

(22) Filed: Aug. 31, 2012

(65) Prior Publication Data

US 2014/0062160 A1    Mar. 6, 2014

(51) Int. Cl.
B60N 2/44    (2006.01)
B60N 2/28    (2006.01)
B60N 2/24    (2006.01)
B60R 22/26   (2006.01)

(52) U.S. Cl.
CPC .............. B60N 2/2812 (2013.01); B60N 2/242 (2013.01); B60R 22/26 (2013.01); B60N 2002/2896 (2013.01)

(58) Field of Classification Search
CPC ........ B60N 2/242; B60N 2/688; B60N 2/682; B60N 2002/684
USPC ............. 297/440.16, 485, 440.15; 248/230.4, 248/227.4
See application file for complete search history.

(56) References Cited

U.S. PATENT DOCUMENTS

| | | | | |
|---|---|---|---|---|
| 4,218,074 A | * | 8/1980 | Crawford | 280/801.1 |
| 4,542,939 A | * | 9/1985 | Geoffrey | 297/481 |
| 4,770,459 A | * | 9/1988 | Nakaiwa et al. | 296/68.1 |
| 5,088,794 A | * | 2/1992 | Iwami et al. | 297/483 |
| 5,568,959 A | | 10/1996 | Weber et al. | |
| 5,630,649 A | | 5/1997 | Heidmann et al. | |
| 5,782,536 A | | 7/1998 | Heidmann et al. | |
| 5,873,634 A | | 2/1999 | Heidmann et al. | |
| 5,979,988 A | | 11/1999 | Heidmann et al. | |
| 6,199,948 B1 | | 3/2001 | Bush et al. | |
| 6,637,823 B1 | | 10/2003 | Ursini et al. | |
| 6,666,520 B2 | * | 12/2003 | Murphy et al. | 297/483 |
| 7,063,389 B2 | * | 6/2006 | Kennedy, Sr. | 297/483 |
| 7,377,589 B1 | | 5/2008 | Glater | |
| 7,954,901 B2 | * | 6/2011 | Foye et al. | 297/473 |
| 8,764,113 B2 | * | 7/2014 | Smith et al. | 297/440.15 |
| 2013/0187421 A1 | * | 7/2013 | Foye et al. | 297/232 |

FOREIGN PATENT DOCUMENTS

WO    WO 2011112182 A1  *  9/2011

* cited by examiner

*Primary Examiner* — David R Dunn
*Assistant Examiner* — Tania Abraham
(74) *Attorney, Agent, or Firm* — Jeffrey P. Calfa; Mark C. Bach

(57) ABSTRACT

An interchangeable passenger seat for a vehicle having a seat-mounting surface includes a base frame having at least one end member attachable to the seat-mounting surface of the vehicle, and at least one cross-member extending generally perpendicularly from the end member. At least one back frame is removably attachable to the base frame. An adaptor bracket is disposed around the cross-member. The adaptor bracket has a plurality of locating structure along the length of the adaptor bracket for selectively locating and attaching components of passenger restraint systems.

7 Claims, 10 Drawing Sheets

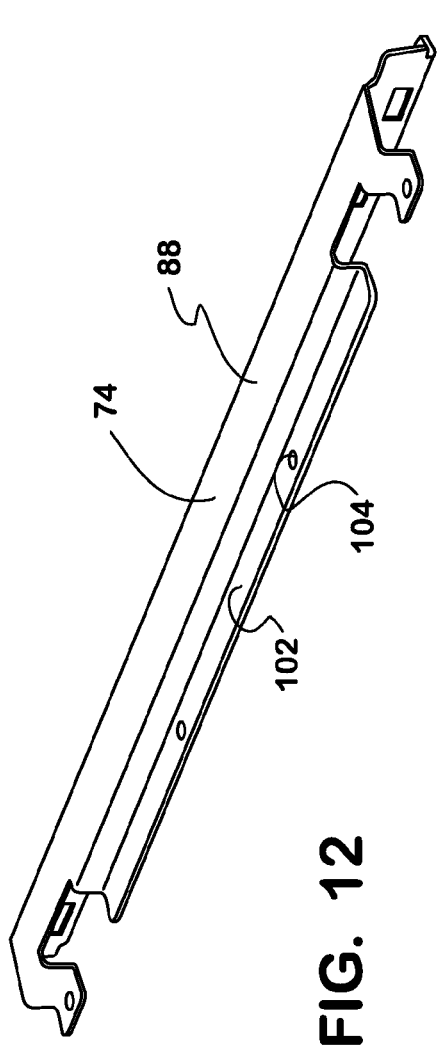
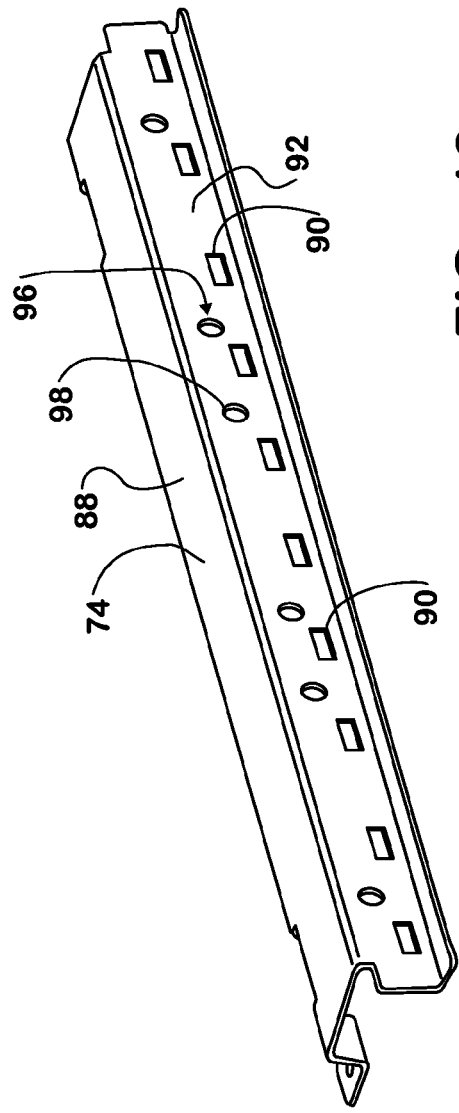

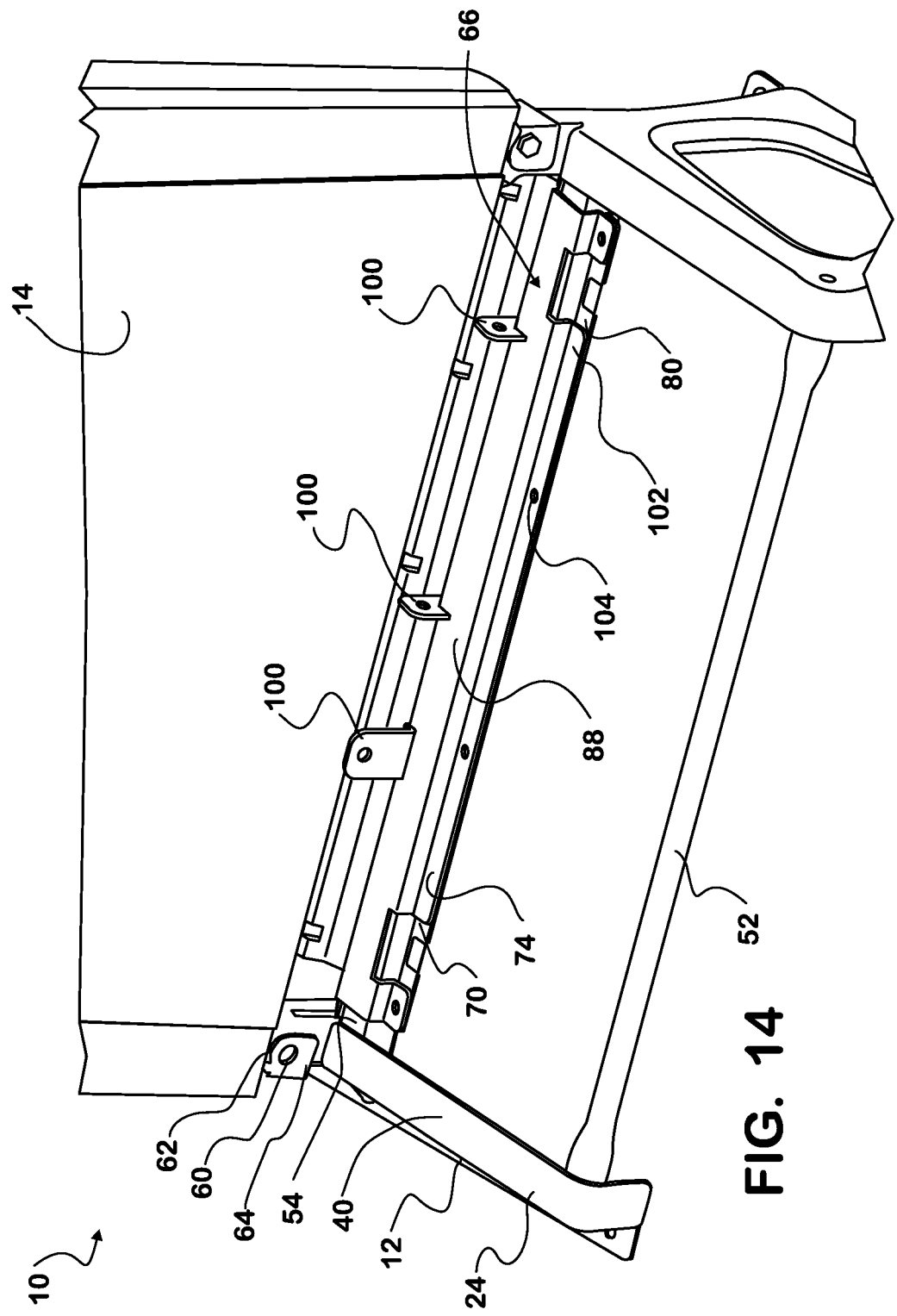

BUS SEATING SYSTEM

BACKGROUND

Embodiments described herein relate generally to passenger seats for vehicles, and more particularly, to interchangeable passenger seats having differing restraining assemblies.

In buses and other heavy vehicles, passive restraint assemblies are commonly used. Passive restraint assemblies are restraints which do not positively restrain the occupant, but which impede the motion of the occupant within a compartment or space.

Recently, three-point belt assemblies have become more commonly incorporated on buses and other heavy vehicles. Three-point seat belt assemblies combine a lap belt and an upper torso belt. In these assemblies, the tongue is swung across the person and is engaged with a buckle affixed to the seat to position one portion of the belt across the lap and another portion of the belt across the upper torso.

In addition to passive restraint and three-point assemblies, a third type of assembly called "Integrated Child Restraint" is also being incorporated on buses. The integrated child restraint assembly typically includes a vehicle seat, a portion of which is pivotable to reveal a child seat contained within the seat.

Since a bus or other vehicle may transport passengers having differing demographics throughout its service life, the types of passenger seats may be changed to accommodate the changing passengers. For example, a bus may include seats having the integrated child restraints if the bus transports young kids, while the same bus may later in its service life transport adults and the integrated child restraints may be replaced with three-point belt assemblies. Further, many buses that were built prior to introduction of the three-point and integrated child restrain assemblies currently have passive restraint assemblies. These buses may have seats to be changed to three-point belt assemblies or integrated child restraints.

SUMMARY

An interchangeable passenger seat for a vehicle having a seat-mounting surface includes a base frame having at least one end member attachable to the seat-mounting surface of the vehicle, and at least one cross-member extending generally perpendicularly from the end member. At least one back frame is removably attachable to the base frame. An adaptor bracket is disposed around the cross-member. The adaptor bracket has a plurality of locating structure along the length of the adaptor bracket for selectively locating and attaching components of passenger restraint systems.

An adaptor bracket for an interchangeable passenger seat for a vehicle, where the interchangeable seat has a base frame with at least one end member and at least one cross-member, includes a generally elongate bottom bracket portion having a first central channel configured for receiving the cross-member. A plurality of hooking elements extend from the first central channel. A generally elongate top bracket portion has a second central channel configured for receiving the cross-member. A plurality of hook receiving holes are disposed on a side surface of the second central channel and spaced along the length of the top bracket portion, where the hook receiving holes receive the plurality of hooking elements on the bottom bracket portion. A plurality of locating structure are disposed along the length of the adaptor bracket for selectively locating and attaching components of passenger restraint systems.

A method of interchanging a seat back of a passenger seat on a base frame having a cross-member includes the steps of removing a back frame of a first seat back from the base frame, placing a new back frame of a second seat back onto the base frame, fastening the new back frame to the base frame, and inserting an adaptor bracket around the cross-member of the base frame. The adaptor bracket has a plurality of locating structures along the length of the bracket. The method further includes the step of selectively locating and attaching components of a passenger restraint system to the adaptor bracket.

BRIEF DESCRIPTION OF THE DRAWINGS

FIG. 12 is a front perspective view of a top bracket portion of the adaptor bracket.

FIG. 13 is a rear perspective view of the top bracket portion of the adaptor bracket.

FIG. 14 is a front perspective view of the adaptor bracket assembled onto a base frame of the interchangeable passenger seat.

DETAILED DESCRIPTION

Figure 5:
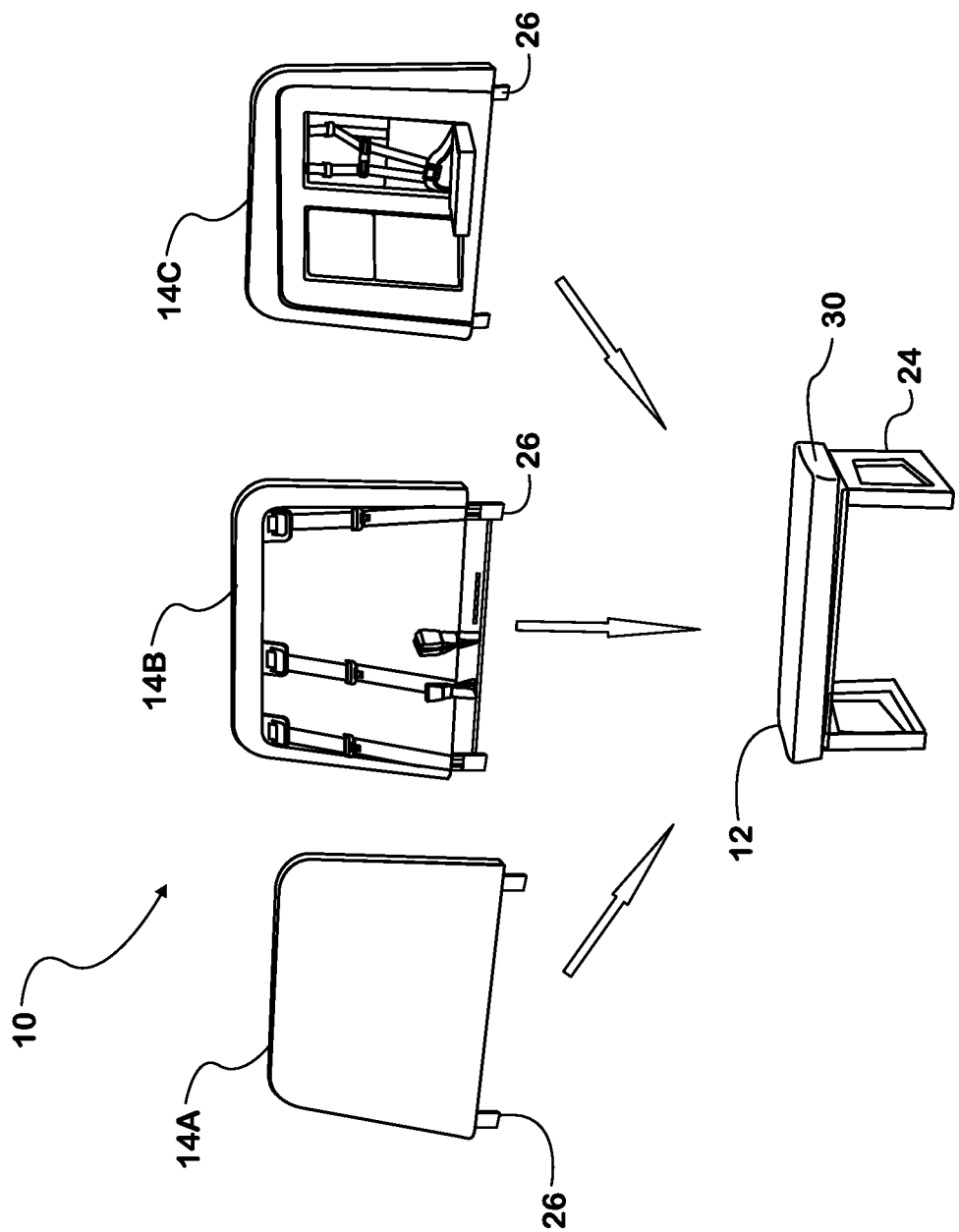
FIG. 5 is an exploded view of an interchangeable passenger seat.
Figure 6:
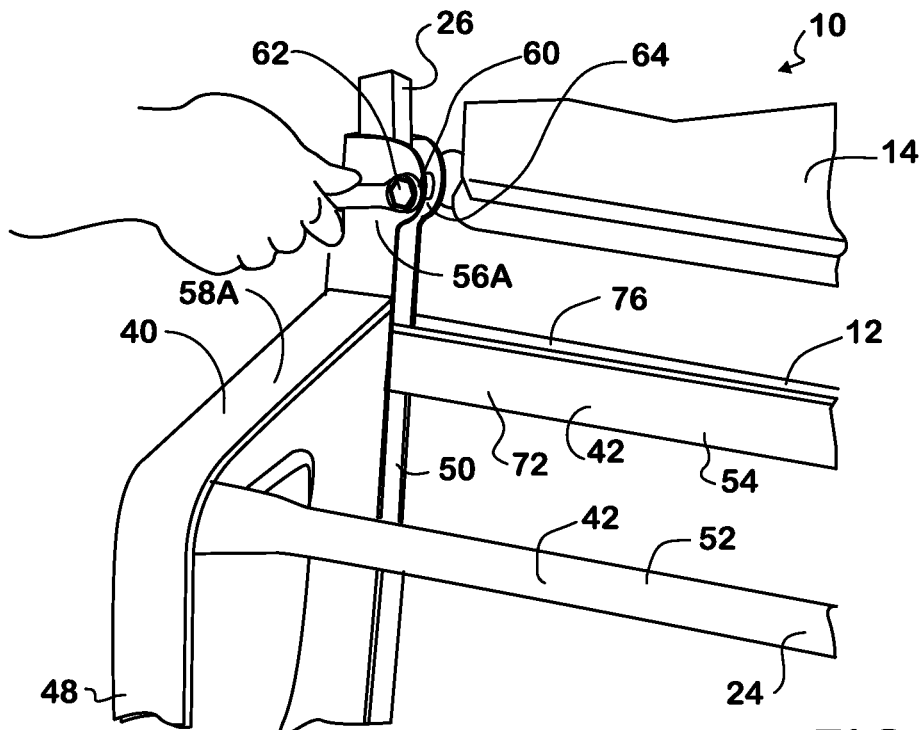
FIG. 6 is a detail view of a back frame of an interchangeable back that is removably attachable to a base frame of a base.
Figure 7:
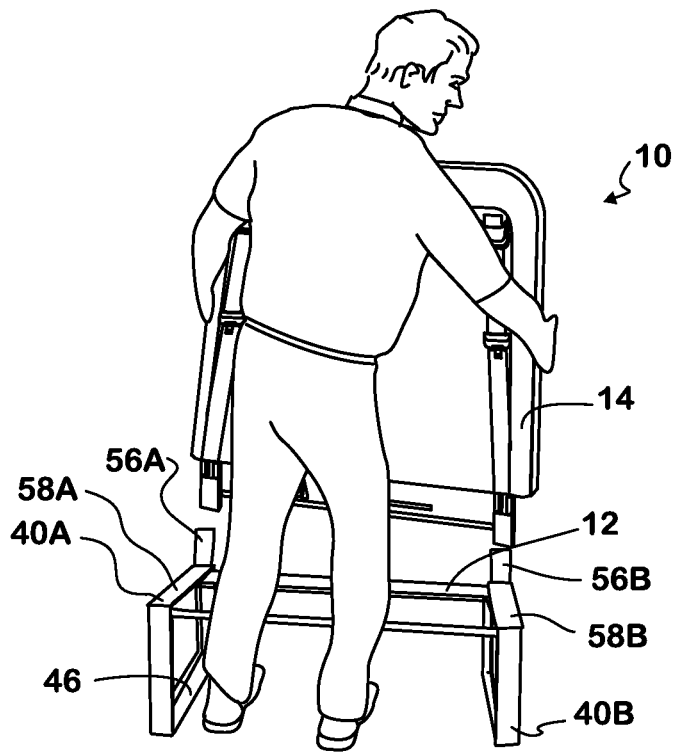
FIG. 7 is a front view of a back frame being received onto the base frame.
Figure 8:
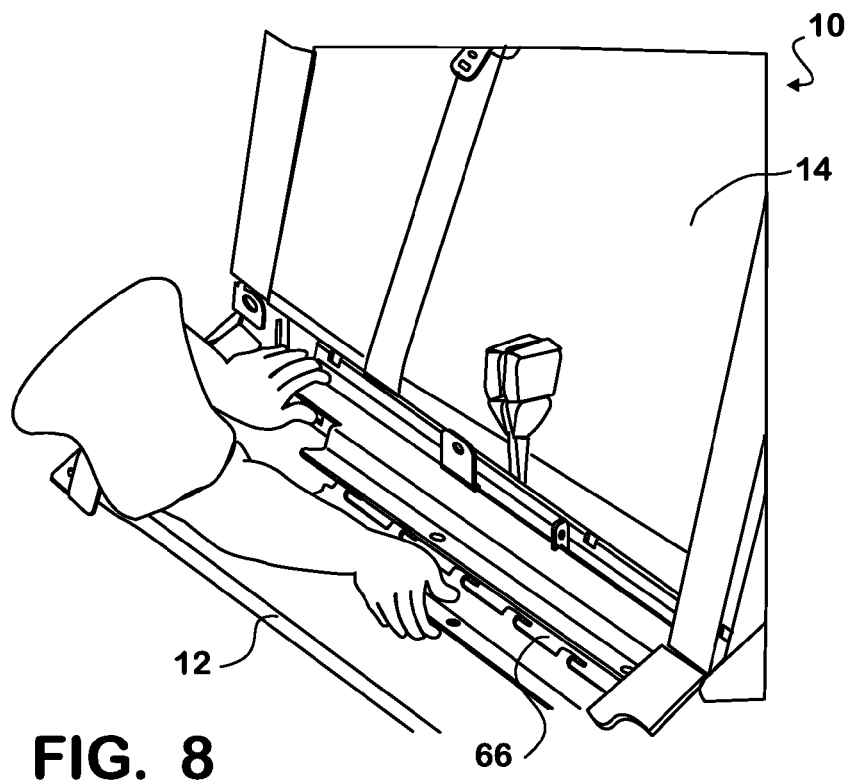
FIG. 8 is a detail view of an adaptor bracket being inserted on the base frame.
Figure 9:
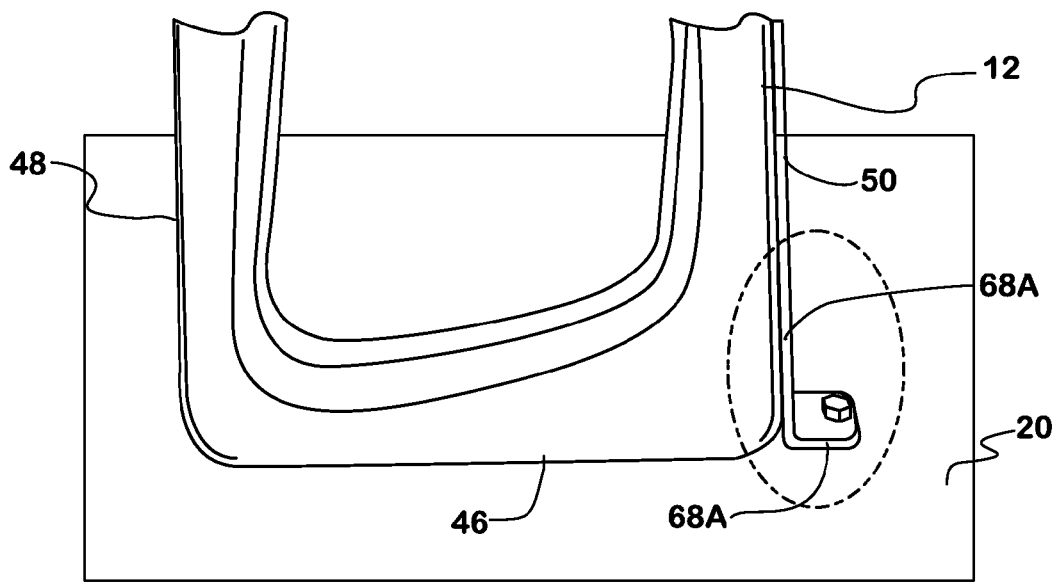
FIG. 9 is a detail view of the base frame having added bracketry.
Figure 10:
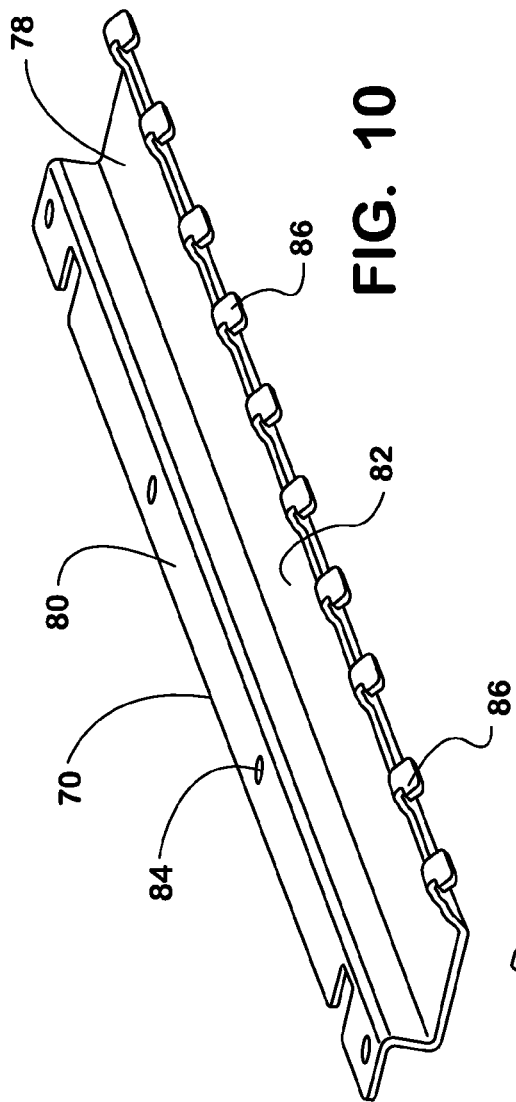
FIG. 10 is a rear perspective view of a bottom bracket portion of the adaptor bracket.
Figure 11:
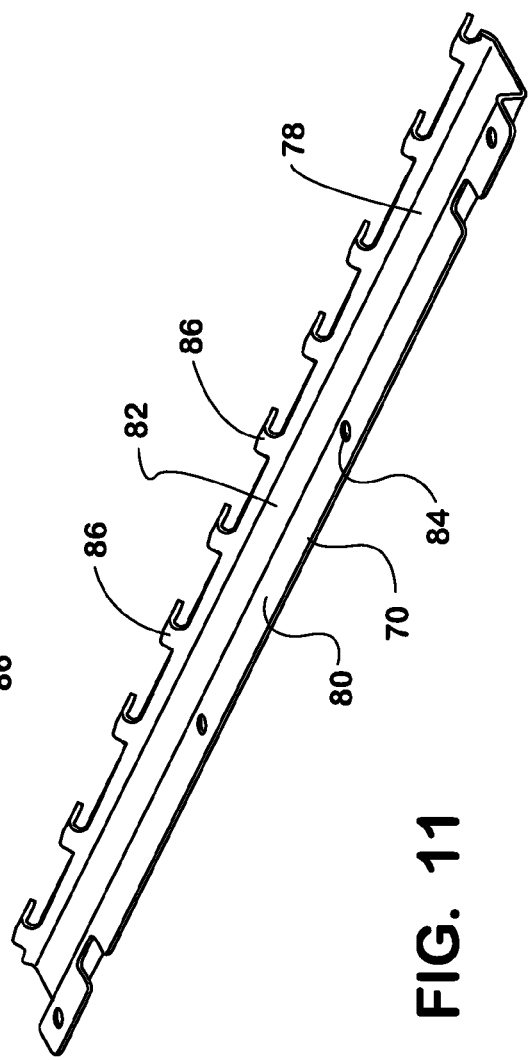
FIG. 11 is a front perspective view of the bottom bracket portion of the adaptor bracket.

Referring to FIGS. 1-5, an interchangeable passenger seat (herein "passenger seat") 10 includes a base 12 and an interchangeable back 14 that is attachable to the base (see FIGS. 5 and 14). While the interchangeable seat 10 will be explained with reference to use in a bus, it should be appreciated that the interchangeable passenger seat can be used in any vehicle or application where seat backs can be interchangeable.

Figure 1:
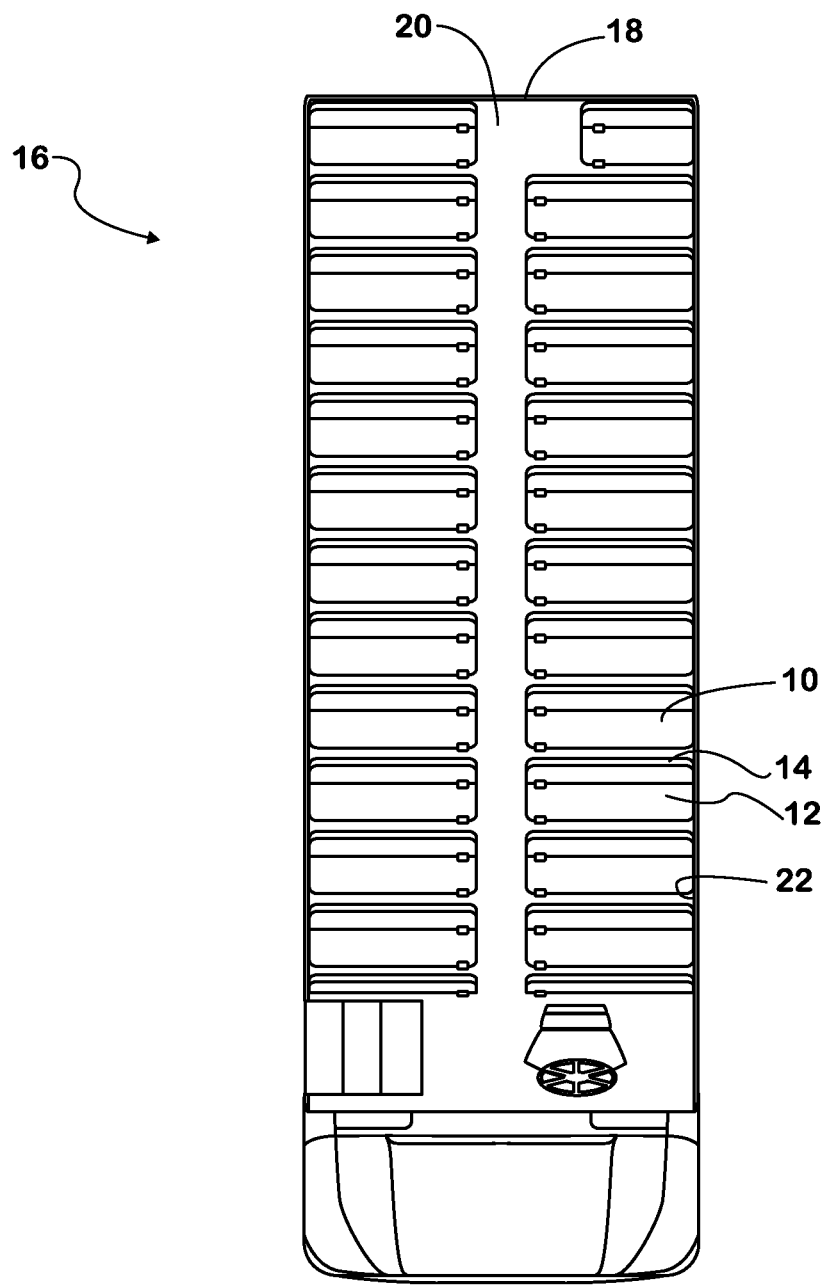
FIG. 1 is a schematic top view of a vehicle having a plurality of passenger seats.
Figure 2:
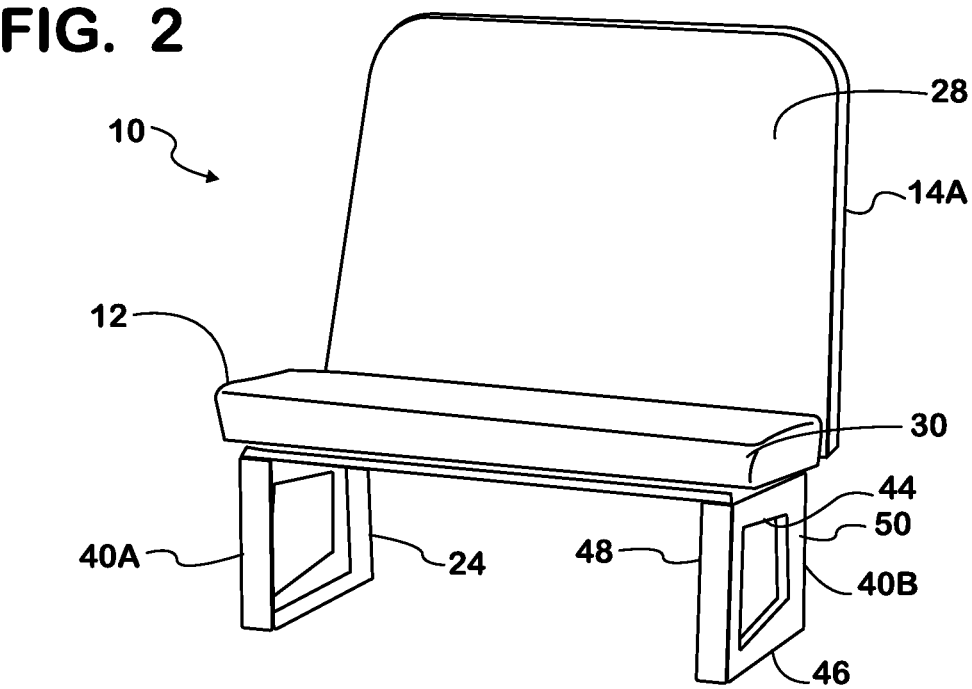
FIG. 2 is a front perspective view of a passenger seat having a passive restraint assembly.
Figure 3:
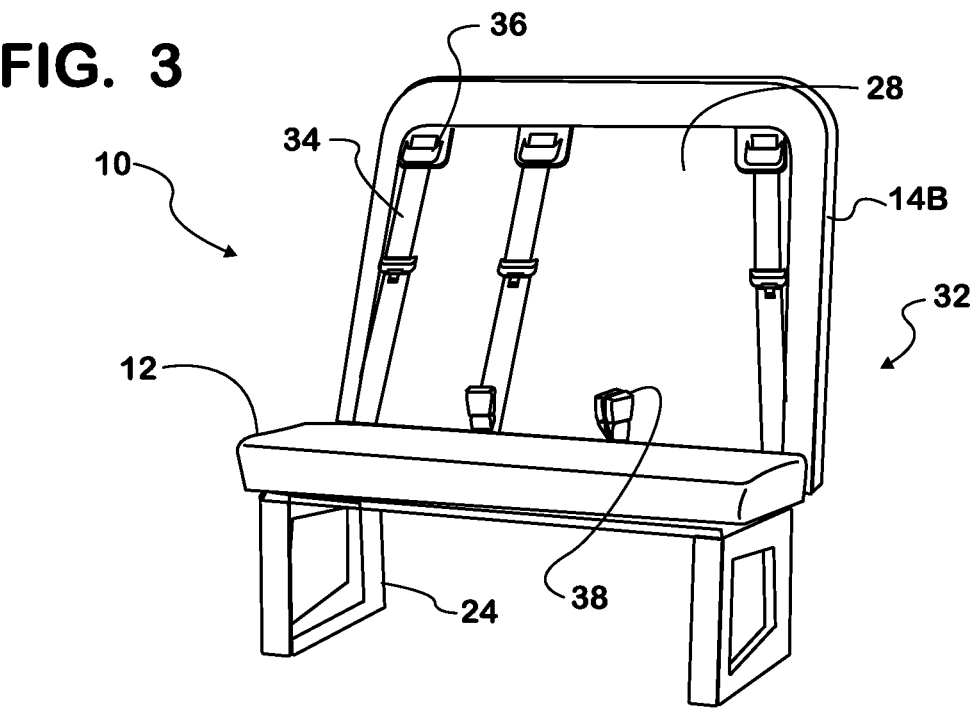
FIG. 3 is a front perspective view of a passenger seat having a three-point belt assembly.
Figure 4:
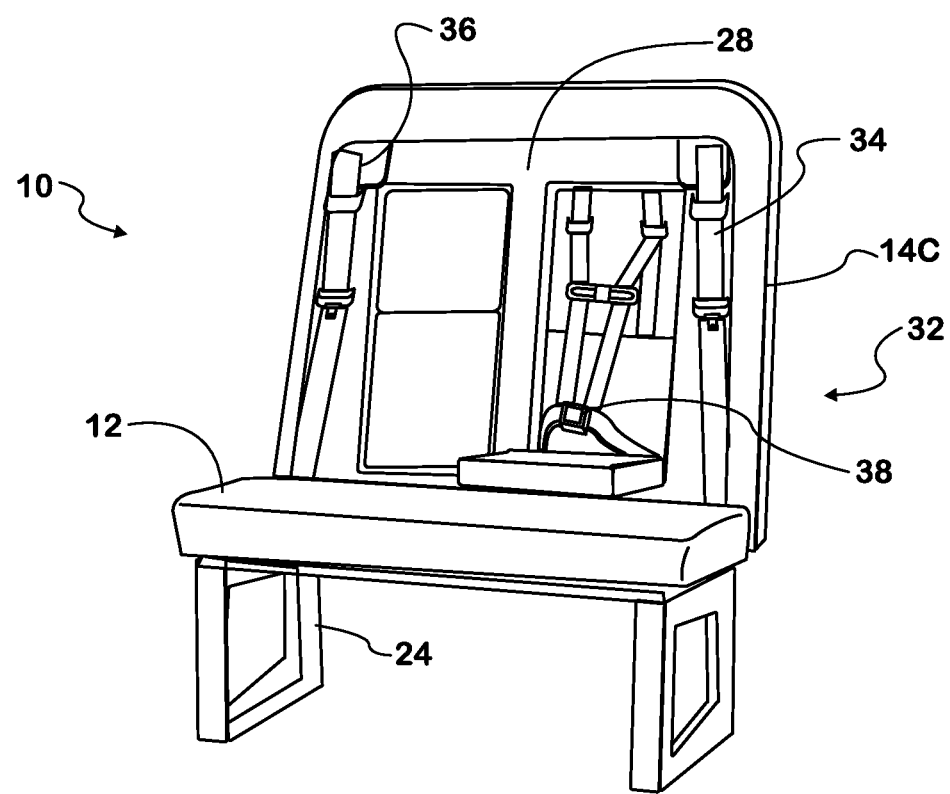
FIG. 4 is a front perspective view of a passenger seat having an integrated child restraint assembly.

Referring now to FIG. 1, a bus or other motor vehicle 16 includes a passenger carrying body 18. The body 18 includes a mounting surface, such as a mounting floor 20 and a mounting wall 22, for the mounting and placement of passenger seats 16. The vehicle 16 may have a series of passenger seats 10 installed on the mounting floor 20 of the vehicle body 18 arranged from the front of the vehicle to the back of the vehicle.

The base 12 may have a base frame 24 that is mountable to the mounting floor 20 of the bus body 18. The base 12 receives the interchangeable back 14. The interchangeable back 14 may be a passive restraint back 14A (FIG. 2), may be a three-point restraint back 14B (FIG. 3), may be an integrated child restraint back 14C (FIG. 4), or may be any other type of back. The passenger seat 10, as shown, has three interchangeable backs 14, however the passenger seat is not limited to having any number or configuration of interchangeable backs.

The interchangeable back 14 has a back frame 26 that is attachable to the base frame 24. The back frame 26 of the interchangeable back 14 may have a generally vertical cushioning layer 28 on the seating side of the passenger seat 10, and may have an impact cushion (not shown) located at the rear side of the back frame 26. The base frame 24 may also have a generally horizontal cushioning layer 30 on top of the base frame.

The interchangeable back 14 may have a passenger restraint system 32 including a restraint belt 34. At least one restraint retractor 36 may be attached to the back frame 26 of the interchangeable back 14 for extending and retracting the restraint belt 34 that is received in a buckle 38. As is known in the art, the three-point belt is configured to encircle a passenger and is configured to secure the passenger's torso against the interchangeable back 14.

Referring now to FIGS. 6-15, the base frame 24 may have at least one end member 40 and at least one cross-member 42 extending generally perpendicularly from the end member. A first end member 40A may be attachable to the mounting floor 20 of the body 18, and a second end member 40B may be attachable to the mounting floor or to the mounting wall 22 of the body 18. The first end member 40A may be generally rectangular-shaped with two generally parallel upper and lower portions 44, 46, and two generally parallel forward and rearward portions 48, 50 (see FIG. 2). The second end member 40B may be generally similar to the first end member 40A or may be a generally elongate member. In the interchangeable seat 10, there is a forward cross member 52 and a rearward cross-member 54 that extend between the first end member 40A and the second end member 40B.

The first end member 40A may also include a receiving structure 56A that extends upward from a top surface 58A of the first end member 40A. Similarly, the second end member 40B may also include a receiving structure 56B that extends upward from a top surface 58B of the second end member. The receiving structure 56A, 56B may be a generally tubular member having a fastener hole 60 for receiving a fastener 62. The back frame 26 may include a receiving bracket 64 that engages the receiving structure 56, and the fastener extends through the receiving bracket to removably attach the back frame 26 to the base frame 24. It should be understood that there are multiple configurations of removably attaching the back frame 26 to the base frame 24 using a fastener 62, such as a bolt.

To remove the interchangeable back 14, the user removes the fasteners 62 attaching the back frame 26 to the base frame 24, and removes the interchangeable back from the base 12. Then the user places a new interchangeable back 14 onto the base 12 and attaches the back frame 26 to the base frame 24 with the fasteners 62. An adaptor bracket 66 is inserted and placed around the rearward cross-member 54, and end member reinforcement brackets 68A, 68B may be added to the end members 40 to anchor the passenger restraint system 32 to the mounting floor 20 and to the mounting wall 22, respectively (see also FIG. 15). The method of removing and replacing the interchangeable back 14 can be accomplished by the user with minimal tools.

Referring now to FIGS. 10-15, the adaptor bracket 66 is adaptable to locate the restraint belts 34 of the passenger restraint system 32 at different locations along the length of the bracket to accommodate different types of interchangeable backs 14. The adaptor bracket 66 has a generally elongate bottom bracket portion 70 (see FIGS. 10-11) that is received on a lower side 72 (see FIG. 6) of the rearward cross-member 54 (see FIGS. 14-15). The adaptor bracket 66 also has a generally elongate top bracket portion 74 (see FIGS. 12-13) that is received on an upper side 76 (see FIG. 6) of the rearward cross-member 54. The bottom bracket portion 70 together with the top bracket portion 74 has a generally hinged "clamshell" configuration that substantially encapsulates the rearward cross-member 54 and extends substantially the length of the rearward cross-member.

The bottom bracket portion 70 has a first central channel 78 generally sized and shaped for receiving the rearward cross-member 54, and a first generally planar lip 80 on one side of the first central channel. The first planar lip 80 extends outward from the first central channel 78 and is generally parallel with a bottom surface 82 of the channel. At least one bolt hole 84 is disposed on the first generally planar lip 80. On the other side of the first central channel 78, the bottom bracket portion 70 has a plurality of hooking elements 86 spaced along the length of the bottom bracket portion.

The top bracket portion 74 also has a second central channel 88 for receiving the rearward cross-member 54, and a plurality of hook receiving holes 90 disposed on a side surface 92 of the second central channel 88 and spaced along the length of the top bracket portion. The hook receiving holes 90 receive the plurality of hooking elements 86 on the bottom bracket portion (see FIG. 15) to form a hinge 94.

Figure 15:
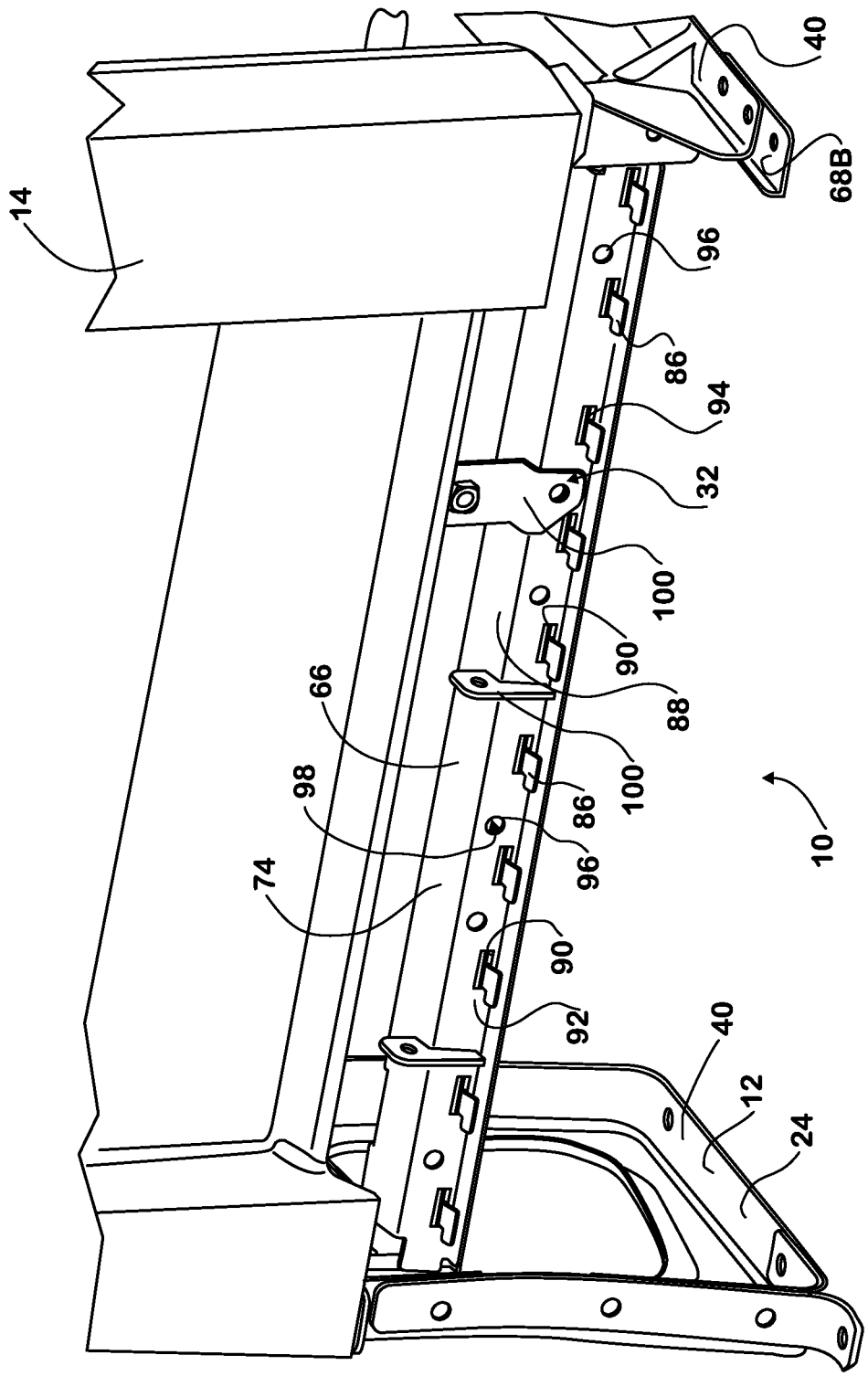
FIG. 15 is a rear perspective view of the adaptor bracket assembled onto the base frame of the interchangeable passenger seat.

Referring to FIGS. 13 and 15, the side surface 92 of the second central channel 88 also has a plurality of locating structures 96 for attaching components of the passenger restraint system 32. In the interchangeable passenger seat 10, the locating structures 96 are attachment holes 98 for fastening components of the passenger restraint system 32, such as tethering brackets 100. The tethering brackets 100 may tether other components of the passenger restraint system 32, for example buckles, retractors, webbing, adjustors, among other components. The tether brackets 100 can have any size or configuration, and may be attached to the adaptor bracket 66 in a variety of ways. The tether bracket 100 may be fastened to the adaptor bracket 66 and the rearward cross-member 54 with a fastener (not shown) through the plurality of attachment holes 98. A user may selectively locate the various tethering brackets 100 of the passenger restraint system 32 to suit the application. For example, for a passive restraint system, no tethering brackets 100 may be attached to the adaptor bracket 66, while for a three-point belt system, multiple tethering brackets may be attached to the adaptor bracket.

Referring to FIGS. 12 and 14, the top bracket portion 74 also has a second generally planar lip 102 extending generally perpendicularly from one side of the second central channel 88. At least one bolt hole 104 is disposed on the second generally planar lip 102. The first generally planar lip 80 of the bottom bracket portion 70 engages with the second generally planar lip 102 of the top bracket portion 74 and may be fastened with a fastener (not shown) through the bolts holes 104 in the second generally planar lip and bolt holes 84 of the first generally planar lip.

The interchangeable passenger seat 10 having the adaptor bracket 66 allows a user to reconfigure the seat back 14 to accommodate the changing needs of the vehicle. With the adaptor bracket 66, a variety of different interchangeable backs 14 having a variety of different passenger restraint systems 32 can be attached to the same base 12, with minimal tools required by the user.

What is claimed is:

1. An interchangeable passenger seat for a vehicle, the vehicle having a seat-mounting surface comprising:
    a base frame having at least one end member attachable to the seat-mounting surface of the vehicle and at least one cross-member extending generally perpendicularly from the end member;
    at least one back frame removably attachable to the base frame; and
    an adaptor bracket disposed around the cross-member, the adaptor bracket having a plurality of locating structure along the length of the adaptor bracket for selectively locating and attaching components of passenger restraint systems wherein the adaptor bracket comprises a top bracket portion and a bottom bracket portion that are hinged together, wherein the bottom bracket portion has a first central channel configured for receiving the cross-member, a first generally planar lip extends from one side of the first central channel, and a plurality of hooking elements extend from the opposite side of the first central channel.

2. The interchangeable passenger seat of claim 1 wherein the back frame is attachable to the base frame at a receiving structure extending upward from the end member.

3. The interchangeable passenger seat of claim 1 wherein the base frame comprises two cross-members including a forward cross-member and a rearward cross-member, wherein the rearward cross-member is located closer to the back frame than the forward cross-member, and the adaptor bracket is disposed around the rearward cross-member.

4. The interchangeable passenger seat of claim 1 wherein the adaptor bracket substantially encapsulates the cross-member and extends substantially the length of the cross-member.

5. The interchangeable passenger seat of claim 1 wherein the top bracket portion has a second central channel for receiving the cross-member, and a plurality of hook-receiving holes disposed on a side surface of the second central channel and spaced along the length of the top bracket portion, wherein the hook receiving holes receive the plurality of hooking elements on the bottom bracket portion.

6. The interchangeable passenger seat of claim 5 wherein the plurality of locating structure are disposed on the side surface of the second central channel of the top bracket portion, wherein the locating structure are attachment holes for fastening components of the passenger restraint system.

7. The interchangeable passenger seat of claim 5 wherein the first generally planar lip of the bottom bracket portion engages with a second generally planar lip portion that extends from the second central channel of the top bracket portion.

* * * * *